(12) United States Patent
Adjali et al.

(10) Patent No.: US 7,983,926 B2
(45) Date of Patent: Jul. 19, 2011

(54) PURCHASES METHOD AND SYSTEM

(75) Inventors: Iqbal Adjali, Sharnbrook (GB);
Malcolm Benjamin Dias, Sharnbrook (GB); Wael El-Deredy, West Kirby (GB); Carmen Maria Sordo-Garcia, Santanbder (ES); Ming Li, Sharnbrook (GB); Paulo Jorge Lisboa Gomes, Little Neston (GB)

(73) Assignee: Conopco, Inc., Englewood Cliffs, NJ (US)

( * ) Notice: Subject to any disclaimer, the term of this patent is extended or adjusted under 35 U.S.C. 154(b) by 866 days.

(21) Appl. No.: 11/811,175

(22) Filed: Jun. 8, 2007

(65) Prior Publication Data
US 2008/0306808 A1    Dec. 11, 2008

(51) Int. Cl.
*G06Q 10/00* (2006.01)
(52) U.S. Cl. ......................................................... 705/1.1
(58) Field of Classification Search .................... 705/1.1
See application file for complete search history.

(56) References Cited

U.S. PATENT DOCUMENTS
6,321,221 B1 * 11/2001 Bieganski ............................ 1/1
7,493,294 B2 * 2/2009 Flinn et al. ...................... 706/12

OTHER PUBLICATIONS

Lisboa, P.J. G., Vellido, A. and Wong. H. (2000) "Bias reduction in skewed binary classification with Bayesian neural networks" Neural Networks, 13, 407-410.
Lisboa, P.J. G., Wong, H., Harris, P. and Swindell, R. (2003), "A Bayesian neural network approach for modeling censored data with an application to prognosis after surgery for breast cancer," Artificial Intelligence in Medicine, vol. 28, No. 1, pp. 1-25.

* cited by examiner

*Primary Examiner* — Shannon Saliard
(74) *Attorney, Agent, or Firm* — Michael P. Aronson (57) ABSTRACT

In an automated method for providing personalised recommendations to a user, a global probabilistic purchase model based on prior interactions of a group of users of a system, is used in the generation of personalised recommendations for future purchases for a given user. Attributes of the given user are used to identify characteristics relating to the user's personal purchasing, correction factors are calculated to update the output of the global probabilistic purchase model to personalise the recommendations for the user.

27 Claims, 5 Drawing Sheets

PURCHASES METHOD AND SYSTEM

The present invention relates to a method and a system for the generation of recommendations for purchases by a user.

In a conventional purchase recommendation system, data on the purchasing history of a user is held on a database and is used to generate a recommendation list. However, such a system is inevitably and inherently of very limited value. For example, it is only relevant and useful for items which are regularly replaced. Also, it is limited in that it does not include goods which the consumer has not actually previously purchased, either in the form of alternates/equivalents, or similar items which are of a higher or lower quality or cost.

In online shopping, it is known to attempt to predict a user's preference for a particular subject-matter or type of goods or service. Hence, when a user requests to see a particular item online, with a view to purchasing that item, the corresponding server application hosting the web site can ascertain what other online shoppers bought together with the particular item requested to be seen. In this way, a number of recommendations can be made to the user which may complement the purchase of the initial item.

However, such marketing techniques are not completely reliable and they are based purely on statistical analyses of other shoppers who are deemed to fall within the category of the present user. Hence, the techniques make no attempt to determine, nor have knowledge of, the actual user.

Since the particular combinations of psychological and physiological characteristics of users differ markedly between one user and another, basic statistical techniques alone are not sufficiently accurate to ascertain the profile of an individual user. Therefore, in order to adapt a content or information to a particular user it is necessary to directly assess and determine the personal attributes of that user.

An adaptive profiling apparatus may determine many of the psychological and physiological characteristics of a user of a mobile computing device, in order to retrieve content and information which are specifically suited or tailored to the likes/dislikes, interests/hobbies/activities and lifestyle preferences etc. of the user in accordance with their personal attributes.

An object of the present invention may be to provide a purchase recommendation method and system which overcomes any one or more of such limitations.

Another object of the present invention may be to provide a purchase recommendation method and system which provides enhanced recommendations with sparse data on prior purchases.

Another object of the present invention may be to provide a purchase recommendation method and system which provides enhanced recommendations personal to the user while operating in environments where data storage is limited.

According to the present invention, there is provided an automated method for providing purchase recommendations to a user, the method comprising:
  generating a probabilistic purchase model based on the purchase transactions of a group of customers, the model providing recommendations for future purchases as a function of the group purchase transactions;
  detecting attributes of the user so as to identify characteristics relating to the user's purchasing behaviour; and
  calculating at least one correction factor, based on the user's attributes, to update the output of the probabilistic purchase model to personalise the recommendations for future purchases for the user.

The method of the present invention may include any one or more of the following preferred features:—

The attribute detecting step inputs data on the user's prior purchases;
The data on user's prior purchases incorporates a calculation based on the number of previous visits made;
The attribute detecting step inputs data on user reports;
The data is derived from results of a purchasing questionnaire completed by the user;
The data is derived from results of an opinion survey completed by the user;
The attribute detecting step inputs behavioural pattern data relating to the user;
The attribute detecting step inputs psychological measures data relating to the user;
The behavioural pattern data or psychological measures data includes input representing interactions between the user and a device;
Applying the correction factor to the probabilistic purchase model to generate a personalised purchase recommendation list for the user;
Enhancing the results from the personalised recommendations to incorporate data on equivalent and/or similar items based on prior user documentation;
The data on equivalent and/or similar items comprise a cost-reduction factor;
The data on equivalent and/or similar items comprise a quality-increase factor;
Storing data representing the user attributes and/or the correction factor at a user unit;
Storing data relating to the probabilistic purchase model at a central server location accessible for operation with the at least one correction factor for personalisation of recommendations.

According to the present invention, there is also provided a computer program product directly loadable into the internal memory of a digital computer, comprising software code portions for performing the method of the present invention when said product is run on a computer.

According to the present invention, there is also provided a computer program directly loadable into the internal memory of a digital computer, comprising software code portions for performing the method of the present invention when said program is run on a computer.

According to the present invention, there is also provided a carrier, which may comprise electronic signals, for a computer program embodying the present invention.

According to the present invention, there is also provided electronic distribution of a computer program product, or a computer program, or a carrier of the present invention.

According to the present invention, there is also provided an automated system for providing purchase recommendations to a user, the method comprising:
  a central unit comprising a probabilistic purchase model based on the purchase transactions of a group of customers, the model providing recommendations for future purchases as a function of the group purchase transactions;
  a module to detect attributes of the user so as to identify characteristics relating to the user's purchasing behaviour; and
  means to calculate at least one correction factor, based on the user's attributes, to update the output of the probabilistic purchase model to personalise the recommendations for future purchases for the user.

The present invention may enable personalization to be feasible: Typically conventionally while there is enough data to build a general model for everyone, and there isn't enough data to build a specific personalized model for each user. However the present invention may make personalizing the model output feasible.

The present invention may significantly improve computational speed: In certain domains, such as shopping via the internet/mobile phone, where there is a required minimum speed of the algorithm, our approach makes it possible to use less complex models, to achieve a performance equivalent to that of more complex models, at a fraction of the computational cost.

The present invention may significantly reduce model complexity: In certain domains, such as shopping via a mobile phone, where there is a restriction on the amount of data that can be stored/transferred, the present invention may make it possible to use less complex models, to achieve a performance equivalent to that of more complex models, using a fraction of the number of model parameters.

The present invention may significantly improve performance: The present invention may significantly improve the average performance of the model, as well as the performance at an individual user level. Initial experiments comparing several different models on retrospective real data have shown that using this approach, the performance of a recommender system is significantly better than a general model.

The present invention includes one or more aspects, embodiments and/or features of said aspects and/or embodiments in isolation and/or in various combinations whether or not specifically stated (including claimed) in that combination or in isolation.

GENERAL DESCRIPTION OF THE PRESENT INVENTION

In order that the present invention may more readily be understood, a description is now given, by way of example only, reference being made to the accompanying drawings, in which:—

DETAILED IMPLEMENTATIONS OF THE PRESENT INVENTION

Figure 1A:
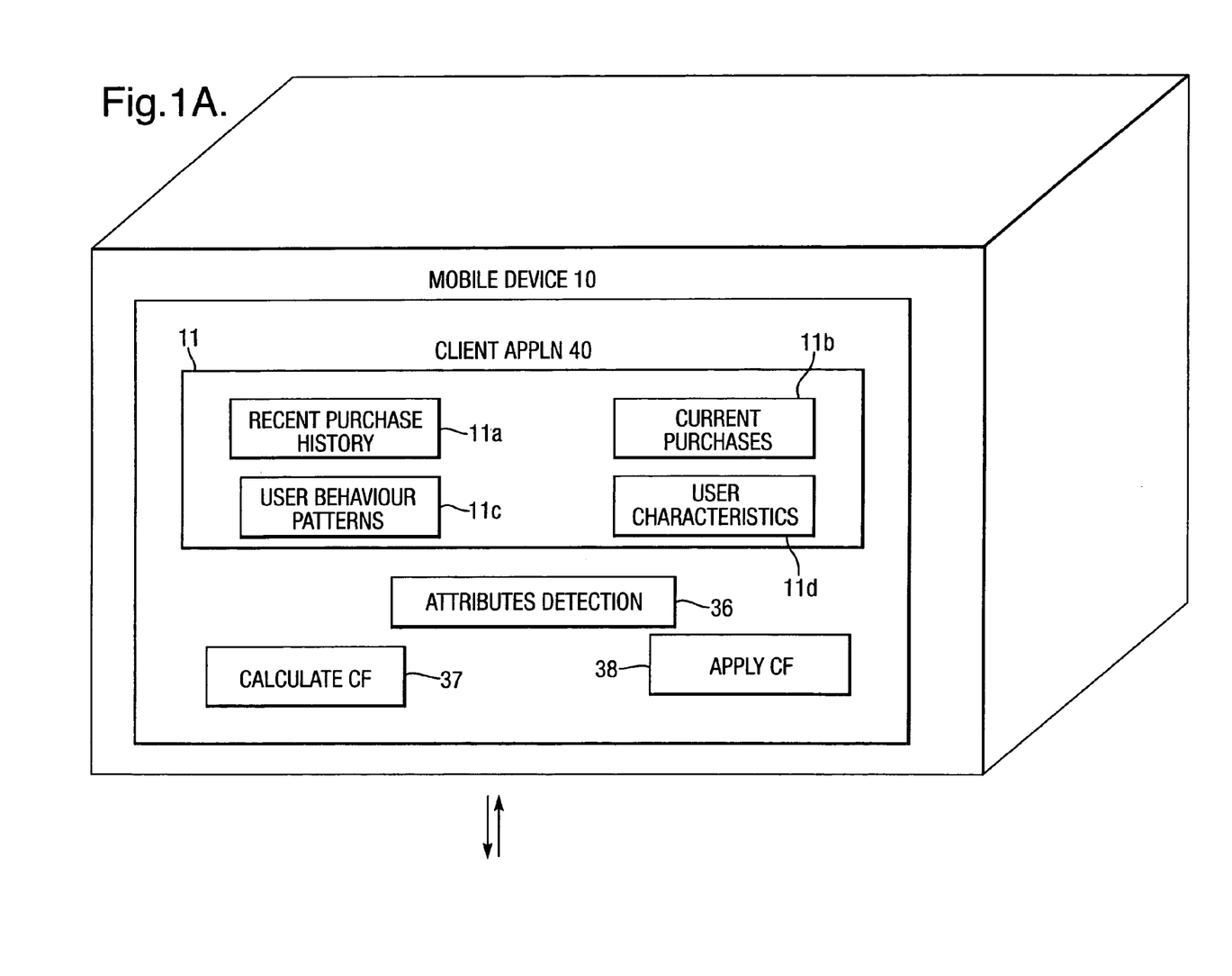
FIGS. 1A and B is a block schematic drawing of a system embodying the present invention.
Figure 1B:
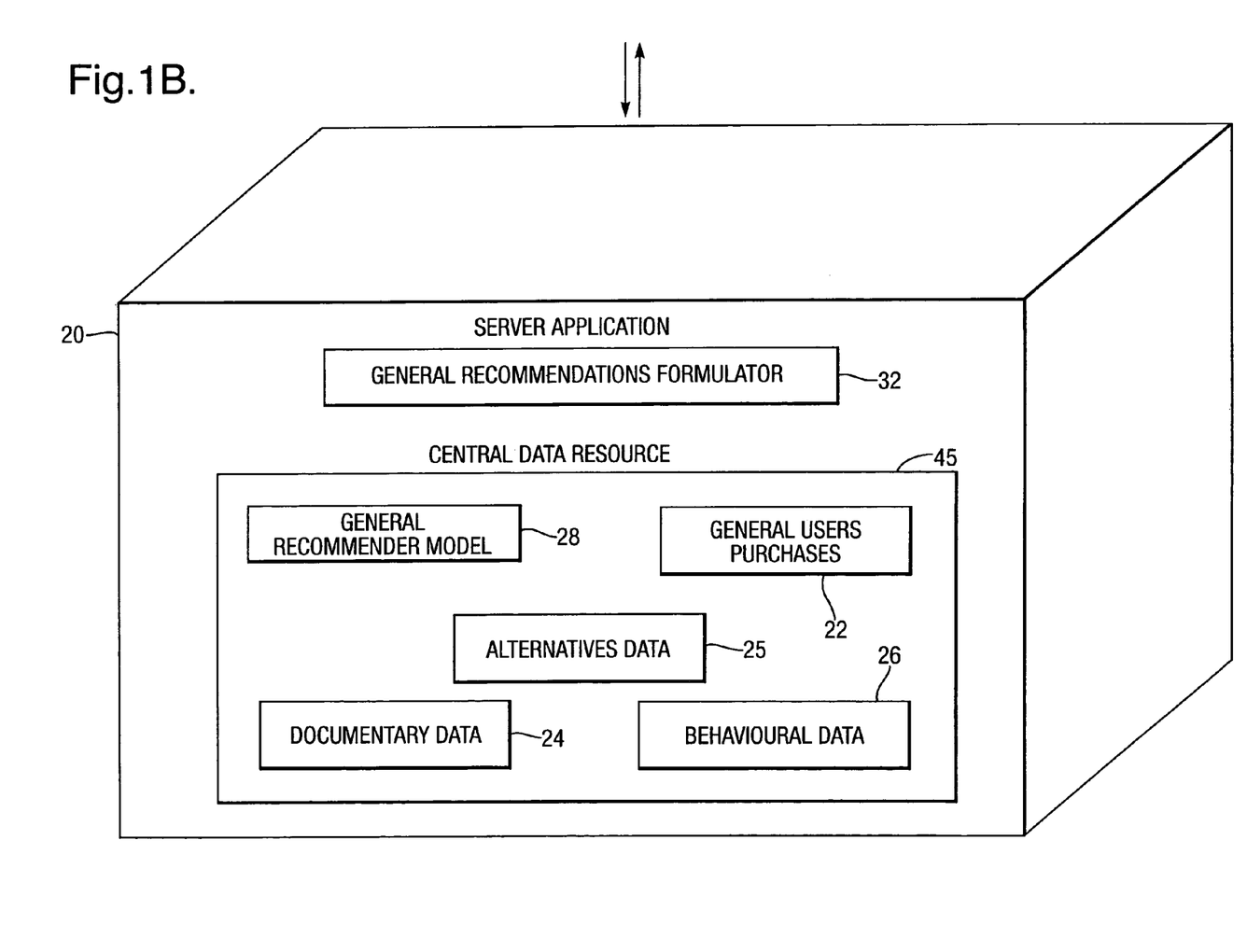

A system as shown in FIG. 1 comprises a personal mobile telecommunications and computing device hereinafter referred to as a mobile 10 communicable with a central unit 20, mobile 10 belonging to an individual user 30.

The system comprises mobile 10 and separate central unit 20, each adapted for communication therebetween. By 'remote', we mean that mobile 10 and the central unit 20 are physically separated and are disposed in different locations with respect to each other.

Mobile 10 is of a kind that is capable of executing a client application 40 and is preferably one of the following devices: a laptop computer, a personal digital assistant (PDA), a smart mobile phone or a tablet PC, modified in accordance with the prescriptions of the following arrangements. It is to be appreciated however, that the mobile 10 may be any suitable portable data exchange device that is capable of interacting with a user (e.g. by receiving instructions and providing information by return).

Preferably, client application 40 may be implemented using any suitable programming language, e.g. JavaScript and is preferably platform/operating system independent, to thereby provide portability of the application to different mobile devices. In these arrangements, it is intended that the client application 40 be installed on the mobile 10 by accessing a suitable software repository, either remotely via the internet, or directly by inserting a suitable media containing the repository (e.g. CD-rom, DVD, Compact Flash, Secure Digital card etc.) into the mobile 10.

In alternative arrangements, the client application 40 may be pre-installed in the mobile 10 during manufacture, and would preferably reside on a ROM (read only memory) chip or other suitable non-volatile storage device or integrated circuit.

The client application 40 is operable to detect the personal characteristics of a user 30 of the mobile 10 in various ways, including by interpreting one or more interactions between mobile 10 and the user 30 to be disclosed in detail hereinbelow. In this way, it is possible to determine a profile of the user 30 that defines at least some of the psychological and/or physiological characteristics of the user 30. Knowledge of this profile may then be used at mobile 10 in the determination of purchase recommendations that is particularly relevant and/or suited to the user 30, and for this content to be presented in the most appropriate manner for the user 30.

In addition to client application 40, mobile 10 holds and stores in memory 11 lists of a limited number of prior probabilities 11a to d relating to the user's personal likelihood of engaging in a particular behaviour (e.g. purchasing an item from a specific category), based on data from the user's own history.

Figure 2:
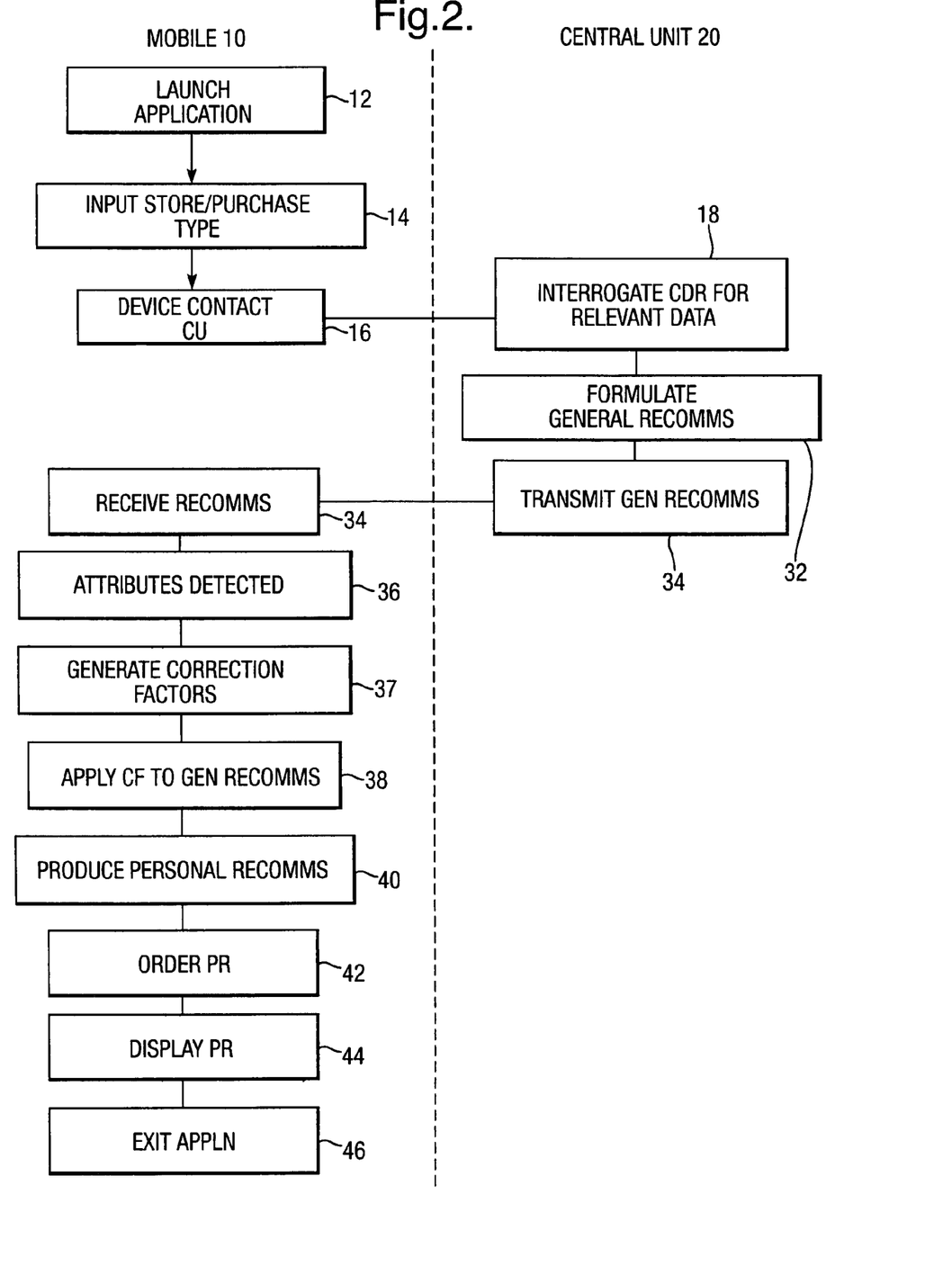
FIG. 2 is a flow diagram of operation of the system in FIG. 1.

Operation of the system is shown in the flow chart of FIG. 2, wherein user 30 launches (12) the application by inputting (14) details of the store being visited, or the purchase type in question, such as the user is about to buy a music CD. Mobile 10 then transmits (16) a signal to central unit 20 identifying user 30 and activating (18) the central unit to download one or more blocks of data from the central data resource 45 concerning the general purchase activities.

Thus, central data resource 45 includes data (22) on previous behaviours of all users of the system, for example detailing the nature of the goods, date of purchase, the store and/or location where purchased, price paid, size of item, quantity, together with any user-input comments on satisfaction as to purchase and/or subsequent use of the goods. Information is also shown as to number of repeat sales of the same items or variations in sizes, prices, bulk sales and so on.

The central data resource 45 can include data (24) on a variety of documentary information derived from past opinions or comments by all users of the system for example from shopper surveys completed by the users, or purchase questionnaires made by the users, or outputs or results of previous times that users have operated the system of the present invention.

The central data resource can include ancillary data (25) on possible alternatives, variations modifications and substitutions for the same or similar goods to those recently purchased by the users, in order to enhance the population of recommendations available and on offer.

The central data resource may also provide data (26) on the users' behavioural patterns and/or psychological measures, particularly as explained in respect of the characteristics as described hereinafter.

Central unit 20 utilises this data in association with a general recommender model 28 in formulating (32) a list of generalized recommendations, which is ordered in descending order of the general likelihood of acceptance, and then transmitted to the user's mobile device. When received (34) at mobile 10, one or more correction factors are generated (37) based on the attributes or personalised priors detected (36) (as discussed elsewhere), and then applied (38) to the generalised list of recommendations of user 30 in order to modify (40) the list of recommendations according to the personal preferences of user 30. The top few recommendations in the list are then prioritised and personalised (42) to user 30.

The mobile 10 then displays (44) the list of personalised recommendations sequentially with appropriate information on size, price and location either derived from the central unit 20 or available from storage within mobile 10, before exit (46).

Mobile 10 may modify the set of recommendations by limiting the number in accordance with the level of recommendations transmitted to it, and/or in accordance with price, and/or in accordance with urgency of need, and/or in respect of another factor.

Also, mobile 10 may transmit items already selected during the current shopping trip presently occurring to the central unit 20, so that the set of recommendations may be modified accordingly, including changing the priority of need in relation to those items just selected.

Once the user 30 decides that no further recommendations are required, the user exits the application.

The present invention is based around the use, to optimum efficiency and effect, of the general recommender model (32) formed of a database produced from purchases in a large general population over the entire range of users, from which there is generated a generalised probabilistic model. The global probabilistic behavioural model may, for example, comprise over five million data bits of information identifying over eight million item purchases each categorised according to a binary buy/no-buy criteria.

In a particularly preferred implementation of the present invention, the output of the general probabilistic model, $P(y|X)$, is converted into the output of a personalized probabilistic model, $\hat{P}(y|X)$ for each individual user.

This is achieved by using the current user's personalized prior $\hat{P}(y)$, to adjust the model output $P(y|X)$, via the adjusting of the Log Odds Ratios, as follows:

$$\log\left[\frac{\hat{P}(y|X)}{(1-\hat{P}(y|X))}\right] = \log\left[\frac{P(y|X)}{(1-P(y|X))}\right] + \log\left[\frac{\hat{P}(y)}{(1-\hat{P}(y))}\right]$$

$$\Rightarrow \frac{\hat{P}(y|X)}{(1-\hat{P}(y|X))} = \left\{\frac{P(y|X)}{(1-P(y|X))}\right\}\left\{\frac{\hat{P}(y)}{(1-\hat{P}(y))}\right\}$$

$$\Rightarrow \hat{P}(y|X) = \frac{P(y|X)\hat{P}(y)}{P(y|X)\hat{P}(y) + \{1-P(y|X)\}\{1-\hat{P}(y)\}}$$

where the individual terms are defined as follows:
$P(y|X)$: The probability of event y occurring for any user, given evidence X.
$\hat{P}(y|X)$: The probability of event y occurring for a particular individual user, given evidence X.
$\hat{P}(y)$: The prior probability of event y occurring, for the particular individual user.

The general model is built assuming equal priors. So for example, if there are n possible items to be recommended, all of the global priors to be equal by setting $P(y)=(1/n)$ for all y's. This is to ensure that the global probabilistic model was built assuming no bias and hence the global priors are not required for the adjustment of the Log Odds Ratios.

If however, the general model is built for example by a third party, using specific global priors $P(y)$, then it is necessary to remove the effect of the global priors, $P(y)$, before applying the personalization adjustment.

Thus the following equation is utilised in place of the equation above:

$$\hat{P}(y|X) = \frac{P(y|X)\hat{P}(y)\{1-P(y)\}}{P(y|X)\hat{P}(y)\{1-P(y)\} + P(y)\{1-P(y|X)\}\{1-\hat{P}(y)\}}$$

Thus, mobile 10 holds a list of attributed or personalised prior probabilities relating to the user's personal likelihood of engaging in each behaviour of interest (e.g. purchasing an item from a particular category), based purely on data from this user's own recent history (e.g. recent purchases/surveys/reports by user), which are continuously updated via physiological, psychological, behavioural or environmental measurements sensed or received by the mobile device.

The central unit 20 uses any relevant data on the user held at the data resource 45 and the group purchase model, to generate a list of generalised recommendations together with their associated generalised (posterior) probability values, which are sent to the mobile. The mobile then uses the locally stored attributed or personalised priors in order to apply, at the mobile, a correction factor to the probabilities associated with the received list of generalised recommendations in order to personalise them, and hence ascertain the personalised posterior probability of each recommendation on the list. The list of recommendations is then ordered according to the personalised posterior probabilities and the user is presented with the top few personalised recommendations.

This embodiment of the present invention provides the ability to personalise the purchases at the point-of-use. The list of attributes or personalised priors is all that needs to be stored on the mobile device and they can be dynamically updated according to, for example, the user's mood, blood pressure, environment (e.g. temperature) at that time.

The general group purchase model may be updated on a monthly basis at the central unit 45, while the attributes or personalised priors, which are used to apply the personal correction boost, can be updated dynamically every minute/second at the mobile 10, provided it is in contact with a monitoring device, for example on the mobile 10, that monitors one or more of the user's physiological, psychological, behavioural or environmental changes.

Figure 3:
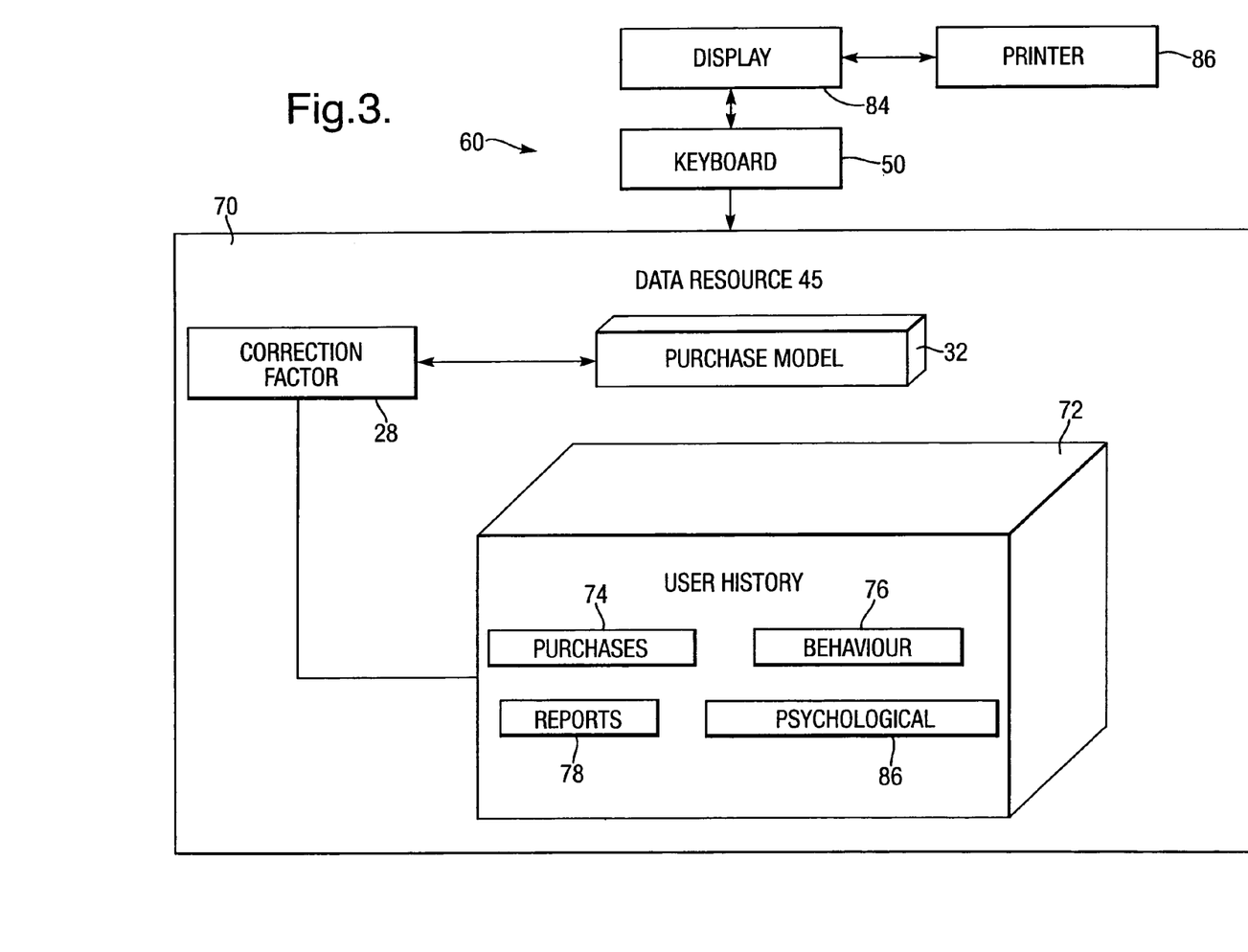
FIG. 3 is a block schematic drawing of a system of a second embodiment of the present invention.
Figure 4:
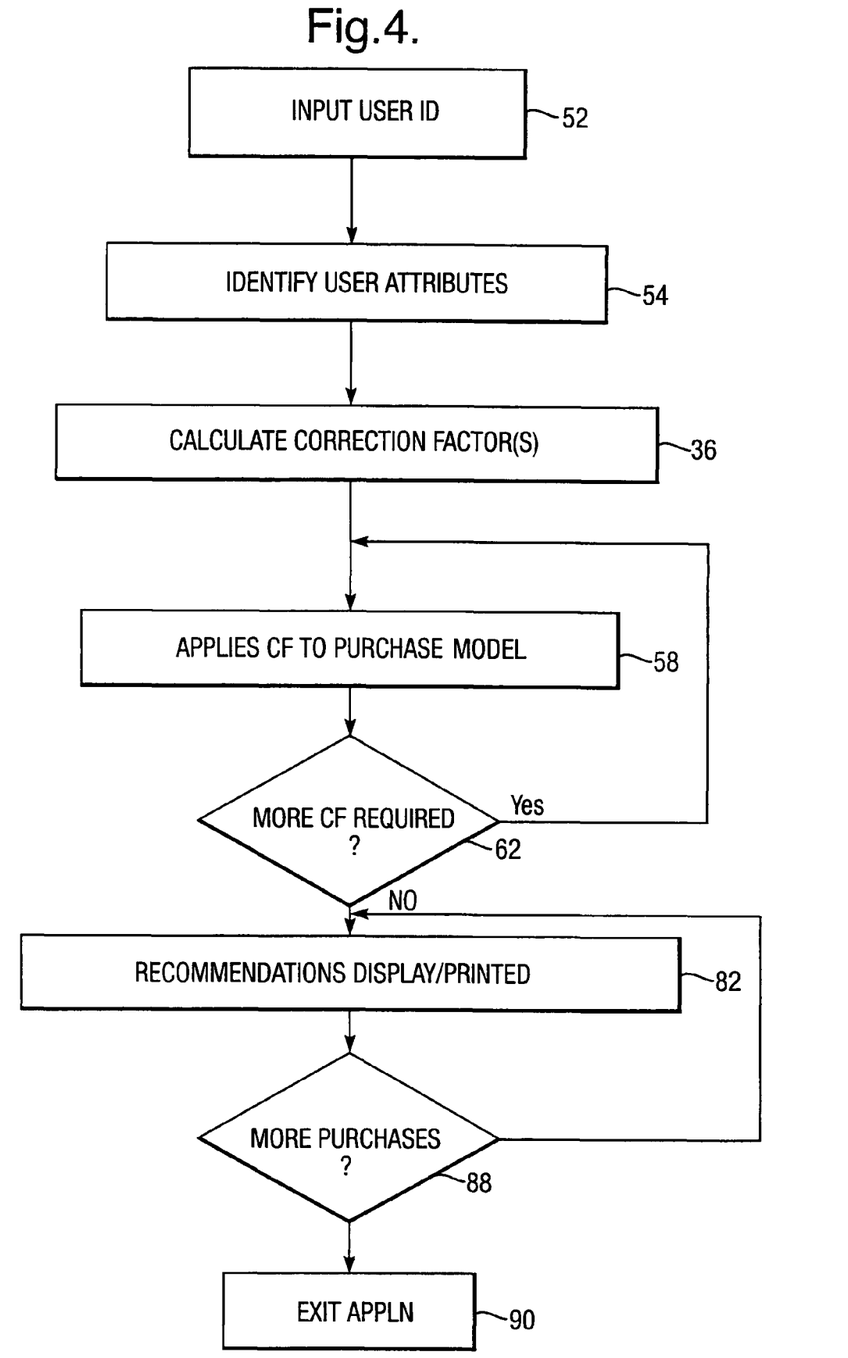
FIG. 4 is a flow diagram of the apparatus in FIG. 3.

FIGS. 3 and 4 shown an alternative embodiment in which the user, upon arrival at a store, inputs 52 his or her user identification code at a keyboard 50 of one of the terminals 60 located throughout the store. The terminals connect to the purchase recommendations system 70 which is networked with all the systems at the respective branches of the retail company, allowing access to the entire purchase history for the user in respect of all stores.

In similar fashion to the previous embodiment, the purchase recommendation system 70 has access to a databank 72 for users in general as well as specific data on individual users comprising comprehensive information (74, 76, 78, 80) on reports, behavioural patterns and psychological measures This provides identification of user attributes (54), and the calculation of correction factors (56) and their application (58) to the purchase model 32 and/or general recommendations. A check (62) is made as to whether further correction factor operations are required.

The resulting recommendations may be displayed and/or printed (82) at display 84 or printer 86 and more purchases (88) may be included before exit (90).

The correction factor operation can be done (i) local to the terminal, or (ii) elsewhere on site at the store, or (iii) at a central processing unit linked to and common to a number of stores.

However, in this embodiment, a more complex probabilistic model can be used, and incorporating more detailed purchase history.

Embodiments of the present invention may provide the ability to generate personalised recommendations by applying a correction factor to a global model, when there is insufficient/sparse data available on each user in order to build a personalised model for each of them.

Also embodiments may provide the ability to use a simple global model along with the personal correction factors in order to generate personalised recommendations, which are comparable in accuracy/quality to the personalised recommendations generated by a more complex model. This enables 1) To deploy the personalised recommender system on systems/devices with limited storage or computational resources, such as a mobile phone.
2) To provide the personalised recommendations at a faster speed via a simple model and a correction factor, as opposed to via a more complex model, enabling for example, the deployment on an online website.

Personal Characteristics

The 'personal characteristics' of a user typically relate to a plurality of both psychological and physiological characteristics that form a specific combination of features and qualities that define the 'make-up' of a person. Most personal characteristics are not static, but rather can generally change or evolve over time as a person ages for instance. The personal characteristics of a user include, but are not limited to, gender, age, ethnic group, hair colour, eye colour, facial marks, complexion, health, medical conditions, personality type (e.g. dominant, submissive etc.), likes/dislikes, interests/hobbies/activities and lifestyle preferences.

However, it is to be appreciated that other characteristics may be also be used to define the characteristics of, or relating to, a person (e.g. education level, salary, homeowner, marital and employment status etc.), and therefore any suitable characteristic for the purpose of adaptively profiling a user is intended to be within the meaning of 'personal characteristics'.

By 'interaction' we mean any form of mutual or reciprocal action that involves an exchange of information or data in some form, with or without physical contact, between mobile 10/terminal 60 and the user 30. For example, interactions include, but are not limited to, touching the device (e.g. holding, pressing, squeezing etc.), entering information into the device (e.g. by typing), issuing verbal commands/instructions to the device (e.g. via continuous speech or discrete keywords), image capture by the device and presentation of audio and/or visual content by the device (i.e. listening to and/or watching content on the device). Furthermore, an interaction may be related to a mode or manner of use of mobile 10/terminal 60, involving one or more of the foregoing examples, e.g. playing music on the device or accessing regular news updates etc.

In preferred arrangements, the client application 40 includes one or more software modules $6_1 \ldots 6_N$, each module specifically adapted to process and interpret a different type of interaction between mobile 10/terminal 60 and the user 30. Alternatively, the client application 40 may include only a single software module that is adapted to process and interpret a plurality of different types of interaction.

The ability to process and interpret a particular type of interaction however, depends on the kinds of interaction the mobile 10/terminal 60 is able to support. Hence, for instance, if a 'touching' interaction is to be interpreted by a corresponding software module $6_1 \ldots 6_N$, then the mobile 10/terminal 60 will need to have some form of haptic interface (e.g. a touch sensitive keyboard, casing, mouse or screen etc.) fitted or installed.

Therefore, the mobile 10/terminal 60 preferably includes one or more of any of the following components, sensors or sensor types, either as an integral part of the device (e.g. built into the exterior housing/casing etc.) or as an 'add-on' or peripheral component (e.g. mouse, microphone, webcam etc.) attached to the device.

A feature is that the client application 40 is configured to employ a technique of 'continuance', that is it remembers (i.e. retains and stores) the profile of the user between interactions. Therefore, the optimisation algorithm is adapted to search the storage devices of the mobile 10/terminal 60, e.g. non-volatile memory or hard disk drive etc. for an existing profile of the user. Hence, when the optimisation algorithm is executed, should any existing profile be found, the algorithm will attempt to update it as opposed to defining a completely new profile. The updating of a profile can be significantly less demanding on the resources of the mobile 10/terminal 60, as many of the personal characteristics will already be known prior to the subsequent execution of the optimisation algorithm. Therefore, the optimisation algorithm performs a 'verification check', to ascertain those attributes that have not changed since the last interaction. Hence, in this way the optimisation algorithm need only match the recently changed personal characteristics in order to update the user's profile.

In preferred arrangements, the mobile 10/terminal 60 and remote data resource communicate using any suitable wireless communications protocol over a telecommunications network, either directly or by way of one or more networked routers. In particular, in the case of mobile phone devices, the communications can take place via the telecommunications cellular phone network.

The data resource may be any suitable server architecture that is capable of receiving and transmitting information via wireless communications, or via wired links to a wireless router etc., and includes at least one 'content' database, either as an integral component of the server or else attached thereto. Preferably, the data resource also operates as a gateway to the internet, allowing the user of the mobile 10/terminal 60 to request information or content that is not local to the data resource but may instead be readily accessed by connecting to the extensive resources of the internet.

The server application is preferably implemented using any suitable programming language, e.g. C, C++, C#, JavaServer script etc., and includes at least one profile matching algorithm. Upon receipt of the user's request and profile, the server application identifies the nature of the request, for example, whether a particular local file or type of file is desired, whether an internet resource is required, and/or whether an applet or other programmed instructions are to be returned to the user etc. However, no particular content will be identified until the server application executes the profile matching algorithm, which then matches the profile of the user to a content and/or programmed instructions specific to the profile category of the user.

Examples of the Present Invention

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of feature solve any problems disclosed herein, and without limitation to the scope of the claims. The applicant indicates that aspects of the present invention may consist of any such individual feature or combination of features. In view of the foregoing description, it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognised that structures, and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and screw may not be structural equivalents in that a nail employs a cylindrical surface, to secure wooden part together, whereas a screw employs a helical surface, in the environment of fastening wooden parts, a nail and a screw may be equivalent structures.

The invention claimed is:

1. An automated method for providing personalised purchase recommendations to a user, the method carried out on a mobile computing device programmed to carry out the method in combination with a server, said method comprising the steps of:
generating a global probabilistic purchase model on the server of purchases in a general population over an entire range of users, the model providing recommendations for future purchases based on purchase transactions of the general population;
detecting on the mobile device, attributes of the user so as to identify personal characteristics relating to a behavior of the user;
calculating at least one correction factor, based on the detected attributes of the user; and
applying on the mobile device the correction factor to the global probabilistic purchase model to modify the recommendations of said model according to personal preferences of the user thereby generating a personalized recommendation list for future purchases for the user:
wherein the mobile device applies the correction factor to convert an output P(y|X) of the global probabilistic purchase model to an output $\hat{P}(y|X)$ of a personalized probabilistic model for the user using a personalized prior $\hat{P}(y)$ of the user wherein $\hat{P}(y|X)$ is computed either according to Eq (1) which assumes equal global priors, $$\hat{P}(y \mid X) = \frac{P(y \mid X)\hat{P}(y)}{P(y \mid X)\hat{P}(y) + [1 - P(y \mid X)][1 - \hat{P}(y)]}, \quad \text{Eq (1)}$$

or according to Eq (2) when specific global priors, P(y) are used $$\hat{P}(y \mid X) = \frac{P(y \mid X)\hat{P}(y)[1 - P(y)]}{P(y \mid X)\hat{P}(y)[1 - P(y)] + P(y)[1 - P(y \mid X)][1 - \hat{P}(y)]}, \quad \text{Eq (2)}$$

where P(y|X) is the probability of event y occurring for any user in the general population, given evidence X, $\hat{P}(y|X)$ is the probability of event y occurring for the user, given evidence X, and $\hat{P}(y)$ is the prior probability of event y occurring for the user.

2. A method according to claim 1 wherein the attributes of the user includes data on prior purchases of the user.

3. A method according to claim 2 wherein the data on the prior purchases of the user incorporates a calculation based on number of previous visits made.

4. A method according to claim 1 wherein attributes of the user includes data on user reports.

5. A method according to claim 4 wherein the data is derived from results of a purchasing questionnaire completed by the user.

6. A method according to claim 4 wherein the data is derived from results of an opinion survey completed by the user.

7. A method according to claim 1 wherein attributes of the user includes behavioural pattern data relating to the users.

8. A method according to claim 1 wherein attributes of the user includes psychological data relating to the users.

9. A method according to claim 7 wherein the behavioural pattern data includes input representing interactions between the user and a device.

10. A method according to claim 1 wherein the personalised recommendations list further includes data on equivalent and/or similar recommendations based on prior user documentation.

11. A method according to claim 10 wherein the data on equivalent and/or similar recommendations comprise a cost-reduction factor.

12. A method according to claim 10 wherein the data on equivalent and/or similar recommendations comprise a quality-increase factor.

13. A method according to claim 1 comprising storing data representing the user attributes and/or the correction factor on the mobile device.

14. A method according to claim 1, comprising storing data relating to the global probabilistic purchase model at a central server location accessible for operation with the at least one correction factor for personalisation of recommendations.

15. An automated system for providing personalised recommendations to a user, the system comprising:
a central unit comprising a General Recommendations Formulator capable of producing a global probabilistic purchase model from a Central Data Resource of purchases in a general population of an entire range of users, said model providing recommendations for future purchases as a function of purchase transactions of the general population;

a module to detect attributes of the user so as to identify characteristics relating to the behavior of the user;

means to calculate at least one correction factor, based on the attributes of the user; and means to apply the correction factor to the global probabilistic model to modify the recommendations of said model according to personal preferences of the user thereby generating a personalized recommendation list for future purchases for the user, wherein the means to apply the correction factor is configured to apply the correction factor to convert an output P(y|X) of the global probabilistic purchase model to an output $\hat{P}(y|X)$ of a personalized probabilistic model for the user using a personalized prior $\hat{P}(y)$ of the user, wherein $\hat{P}(y|X)$ is computed either according to Eq (1) which assumes equal global priors, $$\hat{P}(y \mid X) = \frac{P(y \mid X)\hat{P}(y)}{P(y \mid X)\hat{P}(y) + [1 - P(y \mid X)][1 - \hat{P}(y)]}, \quad \text{Eq (1)}$$

or according to Eq (2) when specific global priors, P(y) are used $$\hat{P}(y \mid X) = \frac{P(y \mid X)\hat{P}(y)[1 - P(y)]}{P(y \mid X)\hat{P}(y)[1 - P(y)] + P(y)[1 - P(y \mid X)][1 - \hat{P}(y)]}, \quad \text{Eq (2)}$$

where P(y|X) is the probability of event y occurring for any user in the general population, given evidence X, $\hat{P}(y|X)$ is the probability of event y occurring for the user, given evidence X, and $\hat{P}(y)$ is the prior probability of event y occurring for the user.

16. A system according to claim 15 wherein the behavior is data related to prior purchases of the user.

17. A system according to claim 16 wherein the data on prior purchases of the user includes number of previous visits made.

18. A system according to claim 15 wherein the characteristics relating to the behavior of the user includes data on user reports.

19. A system according to claim 18 wherein the data is derived from results of a purchasing questionnaire completed by the user.

20. A system according to claim 18 wherein the data is derived from results of an opinion survey completed by the user.

21. A system according to claim 15 wherein the characteristics relating to the behavior of the user includes behavioural pattern data relating to the user.

22. A system according to claim 15 wherein characteristics relating to the behavior of the user include psychological measures data relating to the user.

23. A system according to claim 21 wherein the behavioural pattern data or psychological measures data includes input representing interactions between the user and a device.

24. A system according to claim 15 wherein the personalized recommendation list for future purchases for the user includes data on equivalent and/or similar recommendations based on prior user documentation.

25. A system according to claim 24 wherein the data on equivalent and/or similar recommendations comprise a cost-reduction factor.

26. A system according to claim 24 wherein the data on equivalent and/or similar recommendations comprise a quality-increase factor.

27. A system according to claim 15 comprising means to store data representing the user attributes and/or the correction factor at a user unit.

* * * * *